(12) United States Patent
King et al.

(10) Patent No.: US 7,653,587 B2
(45) Date of Patent: Jan. 26, 2010

(54) AUTOMATED ACCOUNT STATEMENT GENERATION PROCESS

(75) Inventors: Alana King, Champlin, MN (US); Steve Krueger, St. Louis Park, MN (US); Robert C. Simpson, Minneapolis, MN (US); Debra T. Corey, Andover, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 768 days.

(21) Appl. No.: 10/820,071

(22) Filed: Apr. 7, 2004

(65) Prior Publication Data

US 2005/0228679 A1 Oct. 13, 2005

(51) Int. Cl.
*G06Q 40/00* (2006.01)
(52) U.S. Cl. .............................. 705/37; 705/35; 705/36; 705/64
(58) Field of Classification Search ................ 705/331, 705/1–80; 725/1–15; 205/1–5
See application file for complete search history.

(56) References Cited

U.S. PATENT DOCUMENTS 6,073,142 A * 6/2000 Geiger et al. ............... 715/500

2003/0233321 A1 * 12/2003 Scolini et al. ................ 705/40
2003/1023332 * 12/2003 Scolini et al. ................ 705/40
2004/0083184 A1 * 4/2004 Tsuei et al. .................. 705/74
2005/0228679 A1 * 10/2005 King et al. ..................... 705/1

OTHER PUBLICATIONS

McDonnell Douglas. Adobe Customer Spotlight, Oct. 1997, Adob, pp. 2-3.*

* cited by examiner

*Primary Examiner*—Mary Cheung
*Assistant Examiner*—Marissa Liu
(74) *Attorney, Agent, or Firm*—Snell & Wilmer L.L.P.

(57) ABSTRACT

Computer-implemented methods are executed by a software application that allows users to create or edit account statements designated or queued for batch printing runs. This application also allows a test generation of a statement for confirmation of report formats assigned to the statement prior to the month-end statement generation. Finally, the application allows statements to be selected and grouped for generation based upon various account or corporate criteria. Once statements have been selected and generated, they may be sent to a quality review management program for final approval prior to batch printing.

10 Claims, 12 Drawing Sheets

1000

| STMT_ID | RPT_GRP_ID | RECIPIENT_ID | STMT_DESC | STMT_ACTV_CODE | STMT_FREQ_CODE | COPIES_NBR | QLTY_REVIEW_IND | CORP_STMT_IND |
|---|---|---|---|---|---|---|---|---|
| 221 | 312 | 87 | SteveKr Test | Active | Monthly | 6 | 0 | 0 |

| RPT_ORD_ID | RPT_SEQ | STMT_ID | MODEL_ID | ORD_PARM1_TEXT | ORD_PARM2_TEXT | ORD_PARM3_TEXT |
|---|---|---|---|---|---|---|
| 10248 | 1 | 221 | HSSHATAMG | Yes | Yes | |
| 10249 | 2 | 221 | HDMVAMG | | | |

| MODEL_ID | BUSN_OWN_CODE | RPT_CATG_DESC | RPT_NAME | PARM1_LABEL_TEXT | PARM2_LABEL_TEXT |
|---|---|---|---|---|---|
| TSCOM | Both | Tran Summary | Commissions | | |
| TSCFPMG | PMG | Tran Summary | Cash Flow - PMG | Enter period (MON, QTR) | |
| TSCFAMG | AMG | Tran Summary | Cash Flow - AMG | Enter period (MON, QTR) | |
| TDS | Both | Tran Detail | Transaction Journal - Sales | Enter period (MON, QTR) | |
| HSSHATAMG | AMG | Holding Summary | Summary of Security Holdings - AMG | Sec Only line (Yes/No) | Prt FYTD column (Yes/No) |
| HSBPSA | Both | Holding Summary | Fixed Income Allocation | | |
| HDMVPMG | PMG | Holding Detail | Market Valuation - PMG | | |
| HDMVAMG | AMG | Holding Detail | Market Valuation - AMG | | |
| CSRPTCOM433 | AMG | Tran Detail | 433 State of FL Broker Commission Report | | |
| CSRPTCMV498 | PMG | Tran Summary | 498 Brain Science Foundation Chg in Mkt Val | | |
| CSAMAP318 | AMG | AMAP | 318 Iron Workers Local Union AMAP | | |
| CSAMAP302 | AMG | AMAP | 302 AMEX Retirement AMAP | | |
| CS47FPSMD | AMG | Performance | 47F Portfolio Performance Monitor | | |
| CS302PSMD | AMG | Performance | 302 Portfolio Performance Monitor | | |
| BMCOMM | Both | Text Report | Monthly Commentary | Select version | |
| BLOB161 | Both | Text Report | Economic Summary | Enter Report Title | Enter Blob file name |
| BIPTG | Both | Text Report | Tier Board | Select version | |

| RPT_GRP_ID | GRP_REAS_CODE | GRP_DESC | GRP_SHORT_NAME | GRP_LONG1_NAME | GRP_LONG2_NAME | GRP_LONG3_NAME | BUS_OWNER_CODE | DSPL_IND |
|---|---|---|---|---|---|---|---|---|
| 312 | | 312 | Cookie Monster's Fund | Big Bird's House | | | AMG | Y |

| RPT_GRP_ID | RECIPIENT_ID | START_DATE | END_DATE |
|---|---|---|---|
| 312 | 87 | 4/26/2002 | |

| RECIPIENT_ID | RECIPIENT_NAME | MAIL_LABEL_NAME | ADM_SLTN_TEXT | MKT_SLTN_TEXT | TITLE1_TEXT | TITLE2_TEXT | COMPANY_NAME | ADDR1_TEXT |
|---|---|---|---|---|---|---|---|---|
| 2 | Steve Krueger | Mr. Krueger | Mr. Steve Krueger Esq. | Steve | | | | 754 AXP Financial Center |

| ADDR2_TEXT | ADDR3_TEXT | ADDR4_TEXT | CITY_NAME | STATE_PROV_NAME | CNTY_PROV_NAME | ZIP_CODE | COUNTRY_NAME | DEL_MTHD_CODE | SPECIAL_PROC_CODE | BIND_MTHD_CODE |
|---|---|---|---|---|---|---|---|---|---|---|
| Attn: Lynn Sainati | | | Minneapolis | MN | | 55474 | | USMail | MST | Spiral |

| CUR_DOC | CUR_PER | CUR_PER | BUS_OWNE | STMT_ID |
|---|---|---|---|---|
| 07312002000 | 7/31/2002 | 8/7/2002 | AMG | 1 |
| 07312002000 | 7/31/2002 | 8/7/2002 | AMG | 41 |

| RQST_ID | RQST_CODE | RQST_DOC_ID | RQST_DESC | RQST_PLCY_NAME | RQST_PLCY_ID | RQST_DOC_NAME |
|---|---|---|---|---|---|---|
| 126 | 3 | ModelDoc... | BobTest1 | Doc_num | 0731200200019 | 0731200200019 |
| 127 | 3 | ModelDoc... | Alana/Test | Doc_num | 0731200200019 | 0731200200020 |
| 136 | 4 | ModelDoc... | BobTest1 | Doc_num | 0731200200019 | 0731200200019 |

| RQST_ERROR_DESC | RQST_STAT_CODE | RQST_DATE | RQST_APR_IND |
|---|---|---|---|
|  | P |  | B |
|  | P |  | N |
|  | S |  | K |

FIG. 17

AUTOMATED ACCOUNT STATEMENT GENERATION PROCESS

FIELD OF THE INVENTION

This invention generally relates to data processing for financial functions, and in particular it relates to account statement preparation.

BACKGROUND OF THE INVENTION

Standard month-end account statement generation processes can take five or more days for a corporate accounting department to complete. Though such processes are now somewhat automated by various software accounting programs, they remain manually intensive in various aspects. For example, prior systems generate and print statements as a batch printing job, whereby all account statements in the batch may only be printed together (in order to prevent duplicate billing or the loss of individual statements). After printing, the statements are manually reviewed for accuracy and appearance in a quality review process, after which the statements are distributed to the appropriate billed parties. If problems in any statements are discovered during quality review, the data for any such erroneous statements must be re-entered into the accounting system and the entire batch printing job must be run again. This can substantially increase the time it takes to disseminate account statements, thereby negatively impacting the amount of time it takes a company to collect billed amounts or to report account data to its clients.

In addition, in many large scale corporate departments or other entities that employ this type of statement generation, account statement generation programs must retrieve data from diverse accounting systems or platforms that may be employed in various corporate departments. The collection of data across multiple platforms is prone to error and requires time-consuming cross-checking in order to properly confirm the accuracy of any account statements generated in that environment.

Furthermore, many businesses keep only manual records for (i) reporting formats that are to be provided for a given account statement, (ii) recipients and contact addresses for such statements, and (iii) any specialized reporting formats and updates to the same that are needed for a given recipient when multiple statements are generated for the same account. The end result of such manual record-keeping is that statements oftentimes have non-uniform font styles that vary from page to page, inconsistent page numbering schemes, and an inability to reliably generate a table of contents or other useful layouts for batch printed account statements, as may be expected by and useful to a client.

Accordingly, there is a need for a account statement generation process that addresses certain problems in existing technologies.

SUMMARY OF THE INVENTION

It is an object of the present disclosure, therefore, to introduce computer-implemented methods executed via a software application that generates account statements, such as billing statements, credit card statements, and summaries of investment holdings, which are designated for batch printing. In particular, one method for generating account statements for batch printing includes grouping a plurality of accounts for which account statements are to be generated in a batch printing run. The statements may be grouped automatically, based on the accounting department responsible for the accounts, the date on which statements are assigned to be generated, or any other groupings based on available account data. Alternatively, or in addition thereto, a user may assign any of the accounts to a group as may be desired.

Account data for each of the grouped accounts may be retrieved from a financial database or the like. The account data may include financial data used to generate the account statements corresponding to an account, as well as contact information for parties receiving printed account statements, such as the owner of the account or a billed party.

One or more of the accounts may be selected by a user of the software application. The user may then enter parameters for the selected statements, such as: a time period covered by the account statements, a date on which the account statements are to be generated, a status of the accounts corresponding to said account statements, a corporate group responsible for the accounts, a number of copies of the account statements to be printed in the batch printing run, and a designation of whether the account statements are to undergo quality review.

The software application presents the user with reporting formats that are available to be assigned to account statements. Each reporting format may define a printed layout of the account data and contact information to appear on the printed account statements. The user may then assign one or more of the reporting formats to any or all of the selected statements. Multiple statements may have the same reporting format. Some accounts may have more than one statement generated in one or more of the formats, as desired. Statements of differing formats may then be included together in the same batch printing run. In particular embodiments, printing of the batch of generated statements may be completed by the application only after designated statements are approved and released in a quality review process.

The software application allows users to edit, create and/or enter corrections of the account data for any account statements, wherein the correction is entered into the financial database by the application. The software application may further allow users to test generate one or more individual statements from the batch printing run without printing the entire batch. Such application can include or otherwise incorporate automated routines that perform certain editing or statement correction functions, as well as sorting functions for automatically assembling batches of account statements based on any programmed account criteria.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 10 is an exemplary account statement table for use with the process of FIG. 2;

FIG. 11 is an exemplary report order table for use with the process of FIG. 2;

FIG. 12 is an exemplary report definition table for use with the process of FIG. 2;

FIG. 13 is an exemplary report group table for use with the process of FIG. 2;

FIG. 14 is an exemplary report group recipient table for use with the process of FIG. 2;

FIG. 15 is an exemplary report delivery instruction table for use with the process of FIG. 2;

FIG. 16 is an exemplary document tracking table for use with the process of FIG. 2; and FIG. 17 is an exemplary report request table for use with the process of FIG. 2.

DETAILED DESCRIPTION OF THE SPECIFIC EMBODIMENTS

Figure 1:
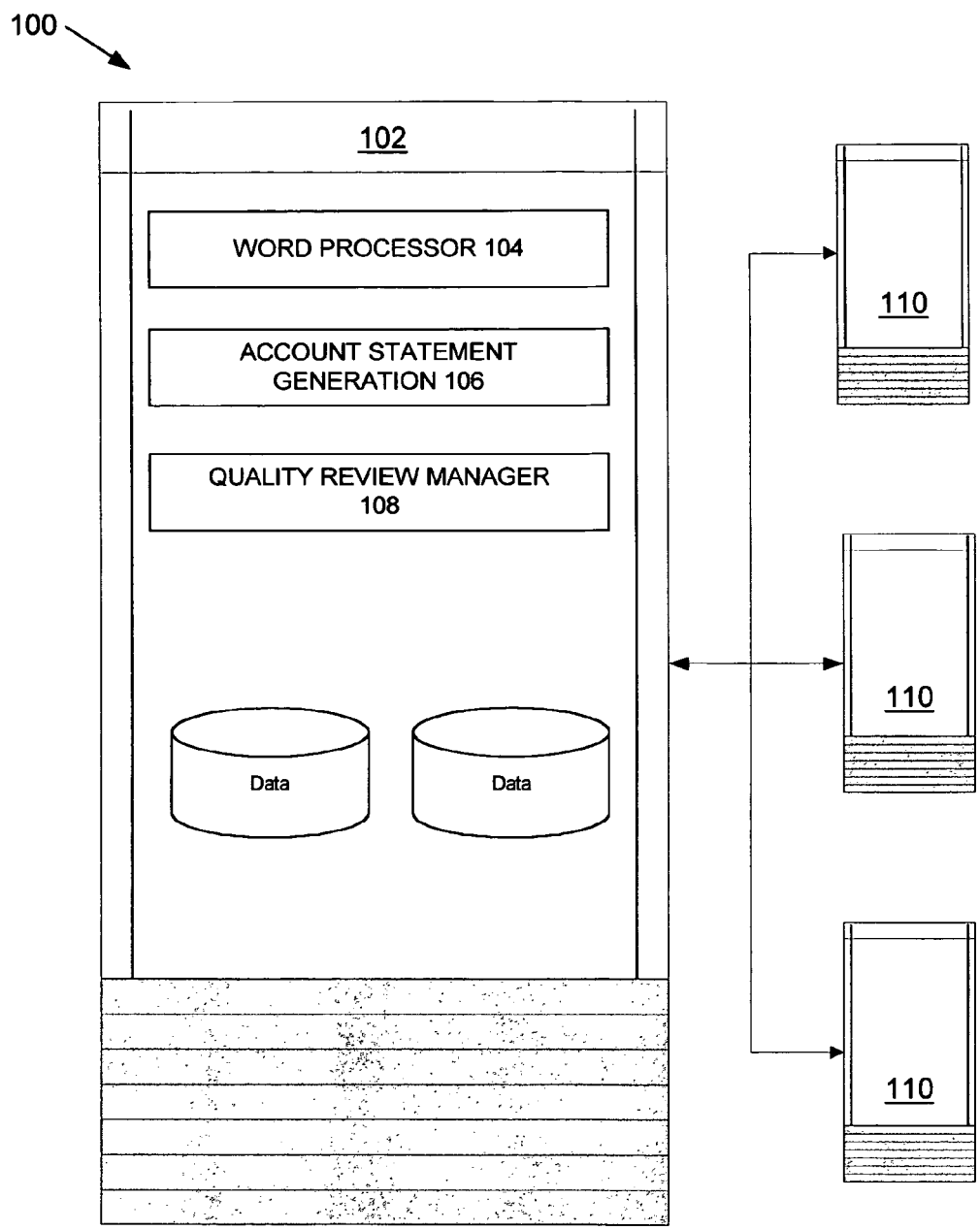
FIG. 1 is a block diagram of an exemplary computer network over which the processes of the present disclosure may be performed.

The purpose of the statement generation processes introduced herein is to allow the grouping and selection of account statements that are organized for a batch printing run, as is common in month-end procedures in the accounting departments of various types of corporations and businesses. The disclosed processes allow account statements to be reliably generated with a common appearance and dispels of the need to reprint an entire batch printing run when one or more statements contain errors, which frequently occurs in prior batch account statement generation processes.

In general, the disclosed account statement generation processes are implemented in a software application that allows accounting personnel to review and edit account statement parameters and associated account data prior to generation, printing, assembly and mailing. This ensures that any account statements sent to clients or customers have an attractive appearance and contain accurate data.

The statement generation application allows users to create statements based upon requests from their clients. For example, it provides the flexibility to create multiple account statements for the same account using different reporting formats for different recipients, and include all such statements in the same batch printing job. When desired, recipients may be sent statements for their accounts at varying frequencies (i.e., monthly, quarterly, annually or any other recurring frequency). Reports selected for a statement may even be ordered in any way that a recipient may desire. This application gives the user complete flexibility in the number and selection of reports for a given recipient, order in which reports appear, and frequency statements are to be generated. The application provides further ease of use by capturing and displaying all potential recipients for a given account, as well as displaying available reports by business line, corporate department, account type, and/or any other available account data.

The statement generation application replaces all of the manual steps that were previously performed via paper records or other like methods to assign statements to recipients and reporting formats to statements. The application accesses a report model that contains all available reporting formats available for account statements and an account data repository. Upon automatic or user-selected designations of reporting formats to be used, the application then automatically generates all accounting statements together in the respective reporting formats designated for the accounts. The report model is developed in a standardized word processing format (such as MICROSOFT WORD), with 'clones' developed for allowing customization of standard report formats for specific clients or recipients. The automated generation of specialized reports eliminates manual updating of the standardized reporting formats, as was necessary in prior systems. The reporting formats specify locations at which account data and recipient contact information, retrieved from the account data repository, are to appear in the printed account statements. The report models are operative to retrieve account data from disparate sources, such as other word processing and spreadsheet programs, and store the data in a common format in order to accommodate consistent appearances for generated statements.

The application may dynamically create a Table of Contents for multi-page statements based upon the report parameters assigned by a user and the account data available. For instance, a statement may include a reporting format that requires a listing of transaction undertaken with the account. However, if no transactions were undertaken for a given reporting period, that report could be automatically suppressed by the application. Because the application dynamically generates a table of contents based upon reports included within a statement, the statement generation process can be updated and completed for each account with no manual intervention or need for paper records.

A footnote function provided with the statement generation application allows a user to insert footnotes and the order in which such footnotes are to appear on a given printed account statement. The footnotes may be assigned to a statement for a user-specified period of time, so that they may be automatically discontinued for future statements without further updating.

The statement generation application allows a user to 'test generate' a subset of individual statements and to print such statements locally to review the appearance and content of the reports, without requiring the printing of an entire batch of grouped statements.

The statement generation application provides its own level of security, in addition to any security features present in the computing environment in which the application is executed. Users are required to log in and verify their identity. Users are also enabled to access only those accounts for which they or their corporate department have been assigned responsibility. Communication of data between the application and separate financial data repositories or databases can be encrypted or otherwise secured in any of a variety of known manners.

Referring to FIGS. 1-17, wherein similar components of the present disclosure are referenced in like manner, various exemplary embodiments of an automated account statement generation process wilt now be particularly described.

In FIG. 1 there is depicted an example of a network 100 over which the account statement generation processes of the present disclosure may be performed. It is readily contemplated that the network 100 may be any type of computer or telecommunications network over which financial transaction data and other electronic information may be communicated including, but not limited to, a local area network (LAN), a wide area network, a corporate intranet, a fiber optic network, a wireless network, the Internet, or any combination or interconnection of the same.

The network 100 may include a central accounting server 102, such as a network server of the type commonly manufactured by IBM CORPORATION. The central accounting server 102 may be any computing device that includes a processor for executing programmed processing instructions and a memory for storing such programs. The central accounting server 102, in the descriptions provided below, is described in the context of a MICROSOFT WINDOWS operating system, although any other operating system may be used to execute the processes disclosed herein.

In certain embodiments, the memory of the central accounting server 102 stores the following: (i) a document editing program 104, such as a word processor (e.g. MICROSOFT WORD), for managing and editing generated account statements; (ii) an account statement generation program 106 as introduced herein; (iii) a quality review and print management program 108; and (iv) one or more databases and database management programs (e.g. MICROSOFT SQL SERVER), including one or more financial databases for maintaining the accounting records and data from which account statements are generated. The account statement generation program 106 and the quality review program 108 contain processing instructions provided in the format of a WINDOWS-compatible development language, such as VISUAL BASIC. The programs 106, 108 may be provided as separate software applications or may instead be integrated as separate modules of the same software application. The interactions of all of these programs and databases will be described in more detail later below.

The central accounting server 102 may be in communication with one or more printing devices (not shown) for enabling the printing of batches of account statements. The central accounting server 102 is also in communication with one or more remote user terminals 110, which may be operated by corporate accounting department personnel or the like to perform the statement generation processes disclosed herein.

The remote terminals 110 may be any type of personal computing device, such as a WINDOWS-based personal computer (PC) of the type commonly manufactured by IBM CORPORATION. The remote terminals may locally store any of the programs described in conjunction with the central accounting server 102. Any of the remote terminals 110 may also be in communication with a local or network printer (not shown) for printing individual account statements. One or more of the remote terminals 110 may further be operative to backup or otherwise redundantly store database information from the server 102.

Although a particular embodiment for the network 100 has been shown in FIG. 1, one of ordinary skill will readily recognize that numerous other configurations, interconnections, and hardware or software architectures for the network 100 and the components thereof are readily available.

Figure 2:
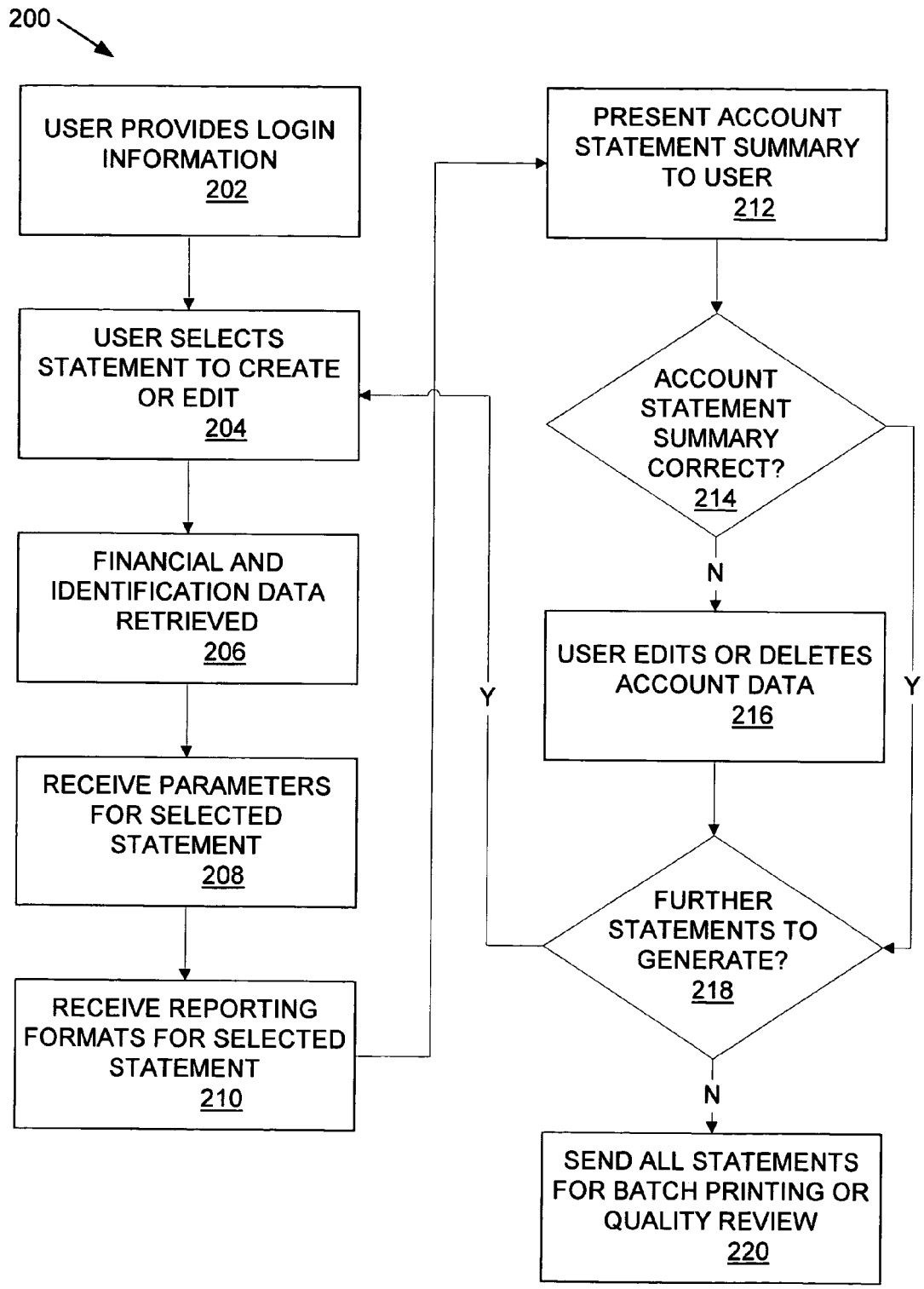
FIG. 2 is a flow chart of an exemplary account statement generation process performed over the computer network of FIG. 1.
Figure 3:
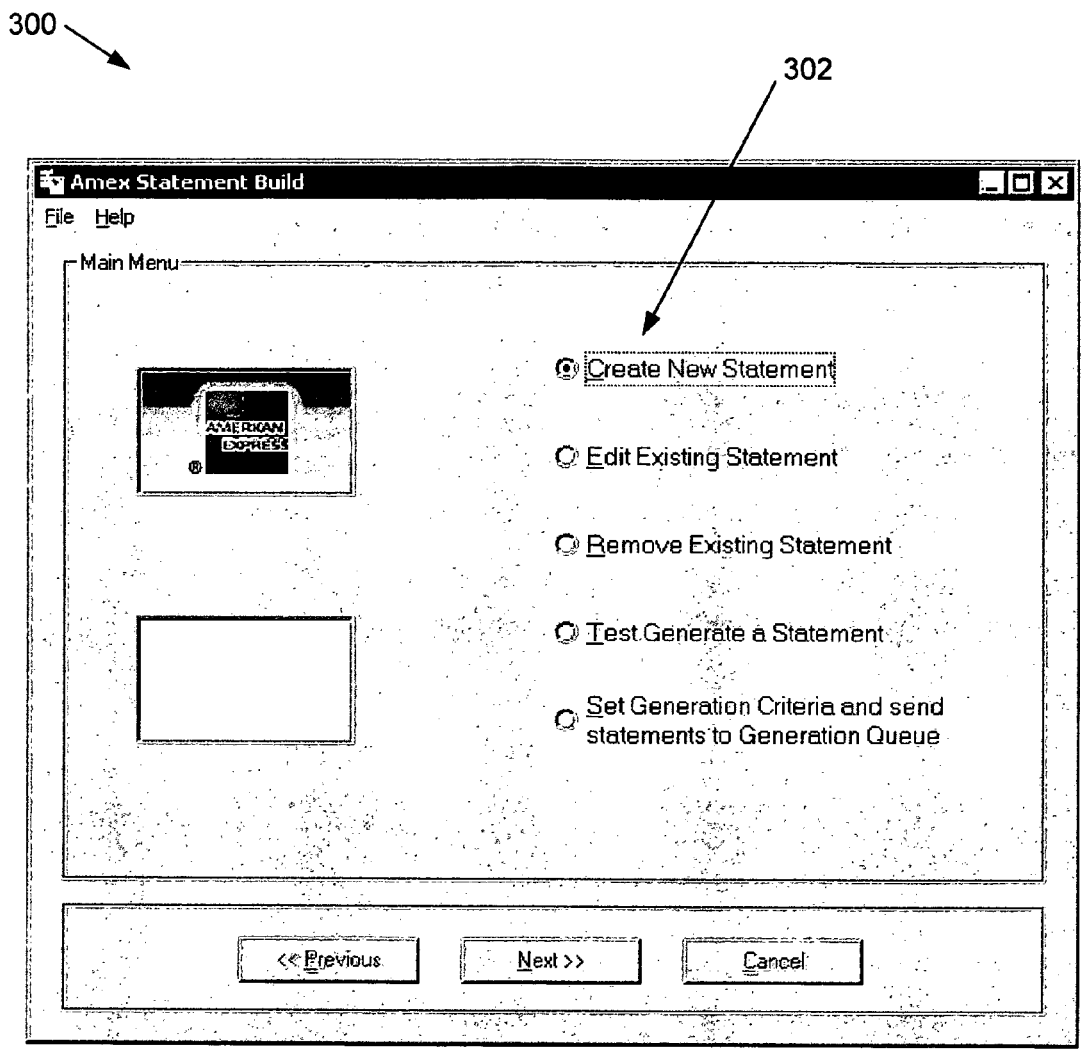
FIG. 3 is an exemplary initial screen display in accordance with the process of FIG. 2.

Turning now to FIG. 2, there is depicted an exemplary statement generation process 200 according to the present disclosure. The process 200 may be performed by the account statement generation program 106 in response to commands entered by authorized corporate accounting personnel or other users, and in conjunction with account data maintained, for example, in the databases of the central server 102. Such account data includes financial information and amounts that are to appear on the printed account statements, contact information for recipients of the account statements, as well as pre-defined layouts for the printed statements. In order to generate the statements, the account data may be compiled from a variety of data formats or applications into a data format used by the word processor 104. One such application capable of compiling data into the requisite format is POWERWRITER by CINCOM SYSTEMS. Other programs or programming techniques may likewise be used.

The process 200 commences when a user provides a valid login identification and password, or otherwise securely identifies herself, to the statement generation application (step 202). Upon validation of the user's identity, the program 106 may select a group of accounts for which the user has been granted access. As one example, the group of accounts may correspond to a batch printing run of account statements assigned to a user's corporate department and that are designated to be generated on a particular date. Any other type of grouping based on available account data may likewise be used. Additionally, the user may select or unselect accounts that belong in a group, provided she has been granted access to do so.

Statement generation commences when a user selects one or more statements to create or edit (step 204). The program 106 provides a graphical user interface (GUI), such as the function selection display window 300 of FIG. 3, from which the user may select any of a plurality of available functions 302, including any one or more of the following: (i) create a new statement, (ii) edit an existing statement, (iii) remove an existing statement from a generation queue, (iv) test generate a statement, and (v) send statements to the generation queue.

A new statement needs to be created whenever a new account has been opened or a new recipient has been assigned to an existing account. An existing statement may need to be edited whenever account data for an account is missing critical information or contains inaccurate data that requires updating. Statements may be manually or automatically removed from the batch generation queue when an account becomes inactive, when the statement has detected errors (i.e., missing account data), when a client changes reporting requirements, or for any other of a variety of other valid reasons. A statement may be test generated in order to confirm that it will correctly print within the subsequent printing of the batch of account statements, without necessitating the generation or printing of the entire batch. Finally, the batch of statements may be sent for generation when all statements have been created and/or edited. Further functions may be provided in this initial window 300, if desired.

Figure 4:
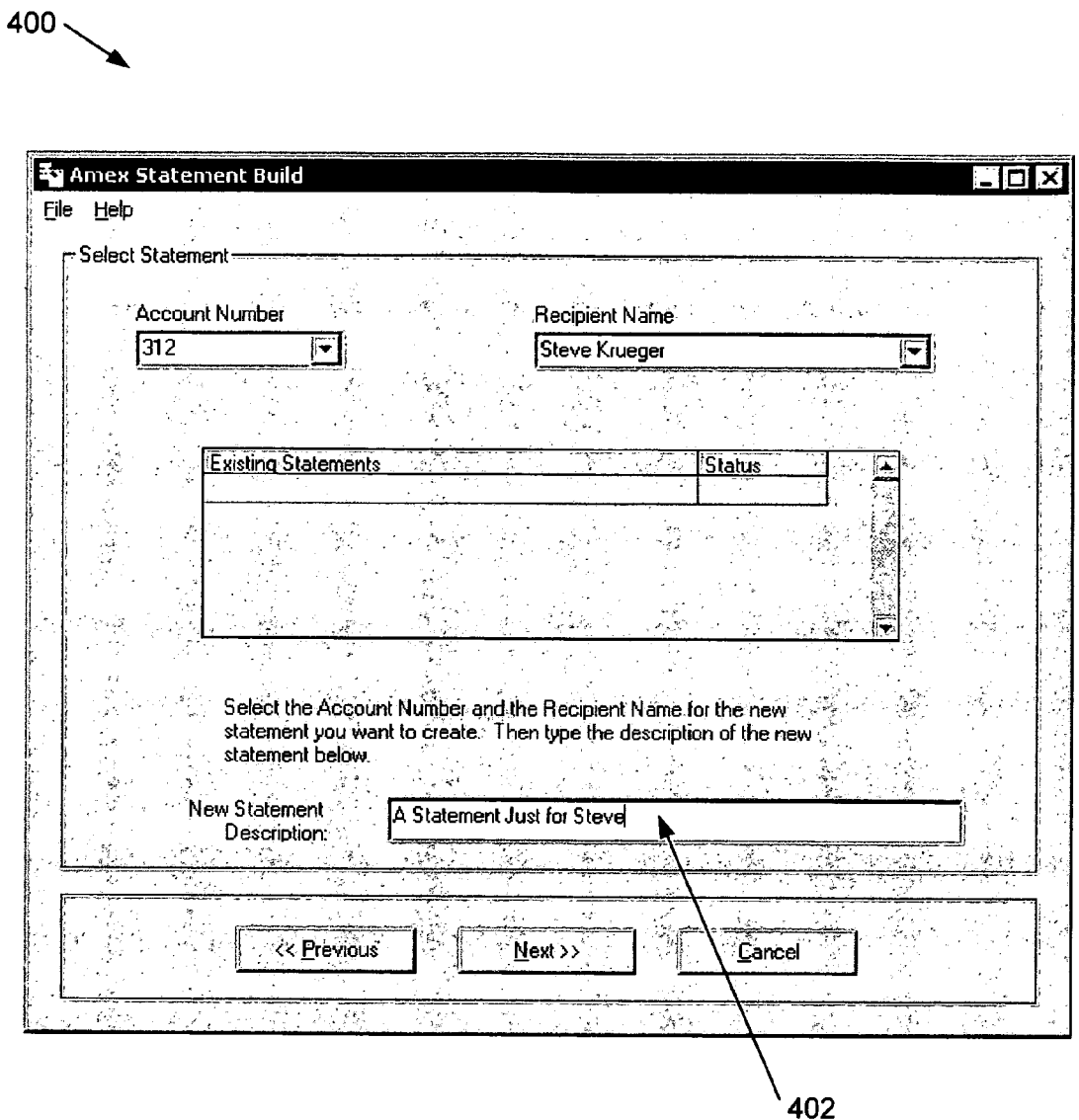
FIG. 4 is a screen display showing an exemplary statement selection window in accordance with the process of FIG. 2.

At step 204, the user may choose to edit an existing statement, which is described in detail below with respect to step 216 below. The user may alternatively choose to create a new statement. In such case, the user may select the "create new statement" function from the plurality of functions 302, the user is presented with a 'create new statement' window 400, an example of which is shown in FIG. 4. The user selects an account number from a drop down box, or may otherwise enter an account number in an appropriate field of the window 400. Such field may include a known 'type-ahead' feature for completing an account number entered by the user. Further functions or search criteria may be provided in this initial window 400, if desired.

The program 106 then retrieves account data, including financial values and recipient identification data corresponding to the account, from the financial databases of the central accounting server 102 (step 206). Upon retrieval of stored account data, the user may then input various parameters for generating an account statement for the account (step 208). The entered parameters may then be stored in various relational databases, as described in more detail further below.

Statement parameters that may be entered include recipients of statements and statement descriptions. The recipients associated with a selected account are presented by the program 106 in a second drop-down box or field of the window 400, from which the user can add recipients or select one or more of the associated recipients for the statement being created. In certain embodiments, new recipient information can not be updated using the program 106, and such changes to account data must instead be directly entered into the financial databases of the central accounting server 102 using an appropriate GUI. In various embodiments, the user may also enter a statement description in field 402, which description may appear only within the program 106 for identification purposes, but which may not appear on generated or printed statements.

A 'cancel' button as shown in FIG. 4 may be selected to cancel the creation of a new statement, after which any parameters entered by a user will not be saved. A 'next' button as shown in FIG. 4 may be selected to enter further statement parameters.

Figure 5:
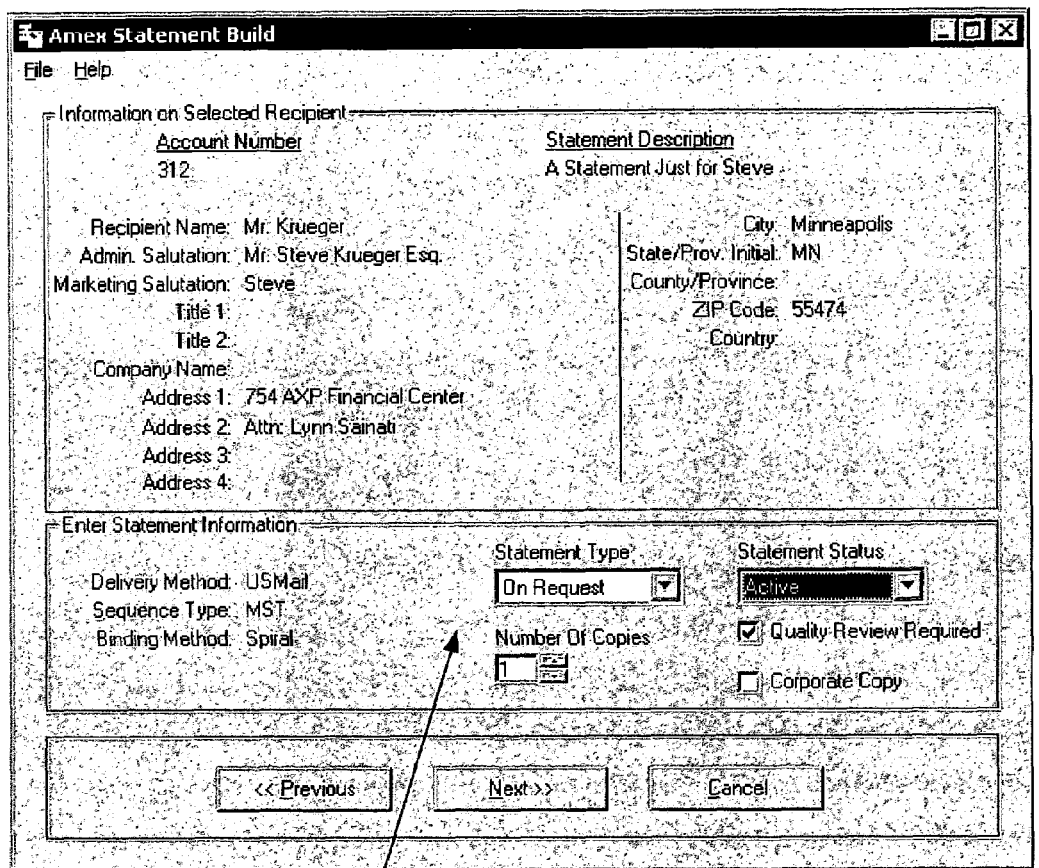
FIG. 5 is a screen display showing an exemplary statement information window in accordance with the process of FIG. 2.

Further parameters may be entered into a recipient and statement window 500, an example of which is shown in FIG. 5. Various parameter fields 502 thereof allow users to input a statement type, statement status, a number of copies to be generated, a designation for corporate review, and a designation for generating internal copies. The 'statement type' (e.g. a frequency at which the statement is to be generated such as: 'on request,' 'monthly,' quarterly,' and 'annually'") may be selected from a drop-down box or field as shown. Other data may likewise be requested in additional parameter fields, where desired.

The statement status (e.g., 'active' for an active account or 'inactive' for a deleted account) may also be selected from a second drop-down box or field within the window 500. The 'number of copies' to be printed may incremented or decreased by clicking up or down arrows in an associated field, or by keyboard entry of an appropriate value. A selection of a 'Quality Review Required' indicator will designate the statement to be reviewed using the quality review manager 108. A 'Corporate Copy' indicator is used to designate that a file copy for the statement be generated and printed. One such corporate copy will then be generated and printed for each reporting format assigned to the account (e.g., if one recipient gets a first account statement for an account, and another recipient gets a second type of statement, the Corporate Copy indicator will enable both statement types to be printed for internal corporate use).

From step 208 above, the process 200 continues to allow a user to select one or more reporting formats for the statement being edited or created for a selected account (step 210). The reporting formats designate printed layouts for the statement, including which type of account data is to appear on the printed statement and its position thereon. The reporting formats may be implemented as word processing macros or the like with appropriate calls to stored account data. Other graphical or text formatting may also be defined by the available reporting formats. In addition to standard reporting formats, certain reporting formats may be customized and stored for particular clients or customers, or groups of the same.

Figure 6:
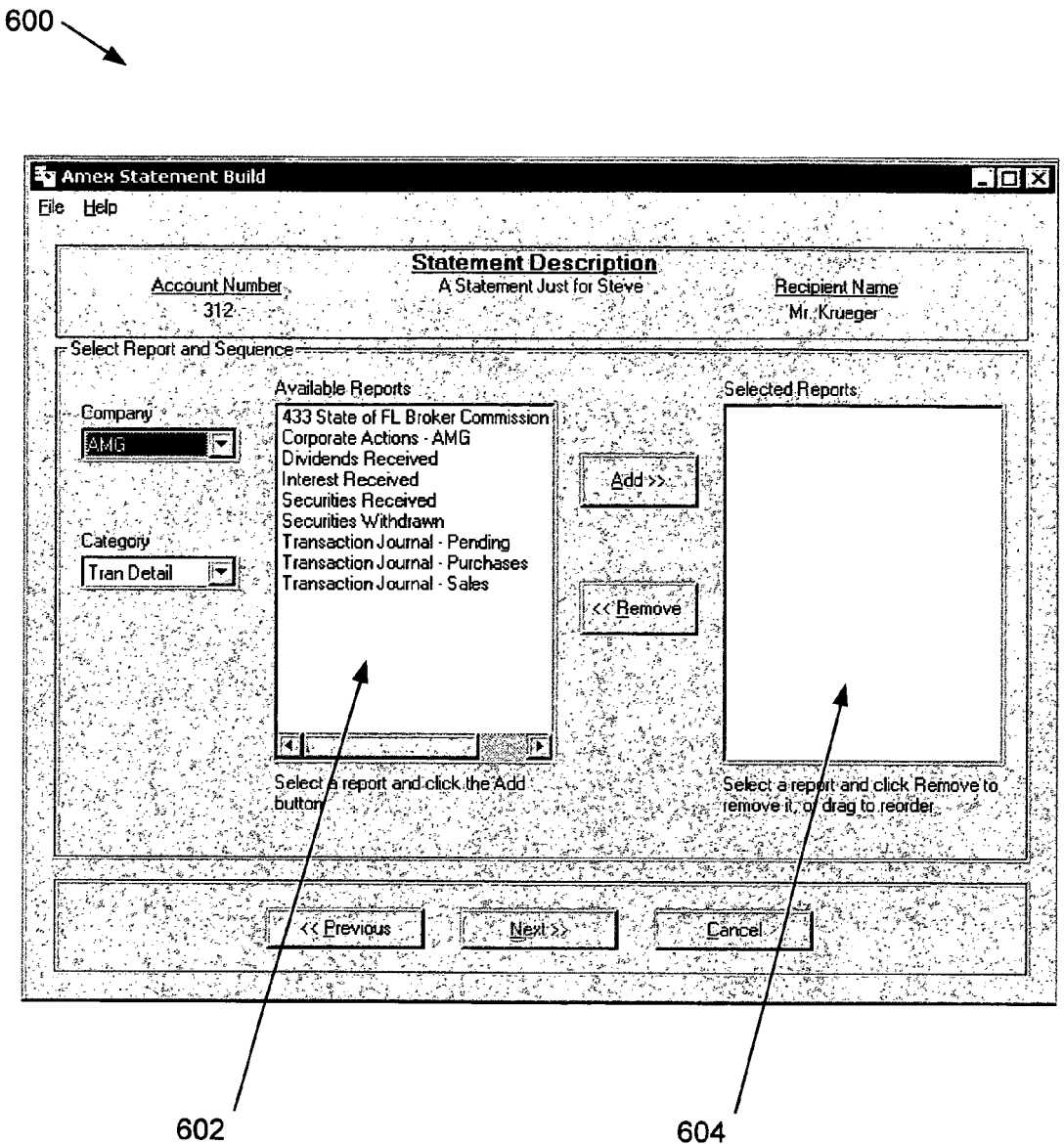
FIG. 6 is a screen display showing an exemplary report selection window in accordance with the process of FIG. 2.

An example of a reporting format selection window 600 is shown in FIG. 6, in which available reporting formats are presented in a first field 602 thereof and reporting formats for the statement may be selected or unselected by adding them to or removing them, respectively, from a field 604. Reporting formats are selected by highlighting and either clicking 'add' or double clicking the desired report with a mouse device, or the like. If multiple reporting formats have been selected, they can be 'dragged' higher or lower in the field 604 to set the order in which corresponding statements will be generated and printed.

The window 600 may include other fields for entry of parameters such as a 'company code' field in which the statement may be assigned to a batch or group, and a 'category code' field in which a pre-defined category of reporting format may be selected. Different choices for reporting formats may be presented in the field 602 based upon the company code and category designated.

Figure 7:
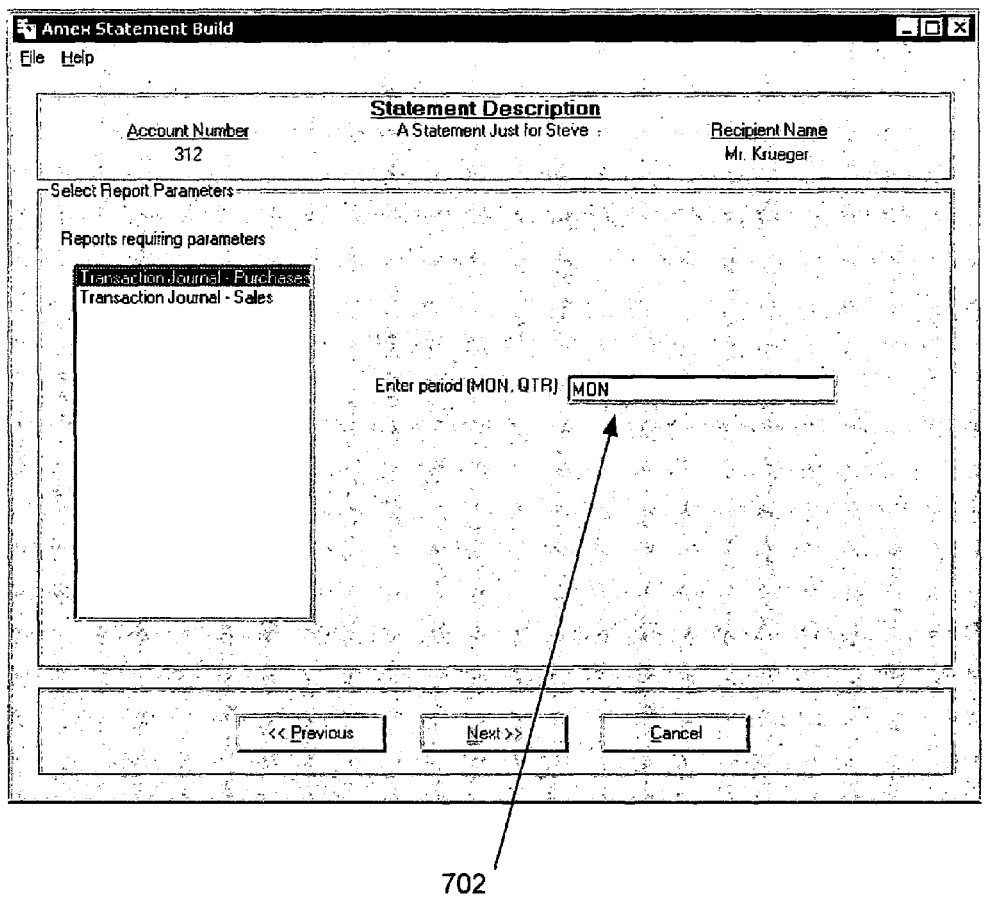
FIG. 7 is a screen display showing an exemplary parameter entry window in accordance with the process of FIG. 2.

Once one or more reporting formats have been assigned, the user may select a 'next' button which may navigate the user to an additional parameter entry window 700, an example of which is shown in FIG. 7. Additional statement generation parameter fields 702 are then presented to a user for a selected statement. The user may enter any requested statement generation parameters, such as a time period (e.g. current month, current quarter) to be covered by the selected statement. Additional parameters may also be required to be entered in the window 700. The window 700 may present only those parameters that are required for a designated reporting format. The label for the field 702 may change from that shown in FIG. 7 based on the parameters required. In addition, any of these parameters may be entered or updated during step 208 above and before the selection of a reporting format in step 210.

Figure 8:
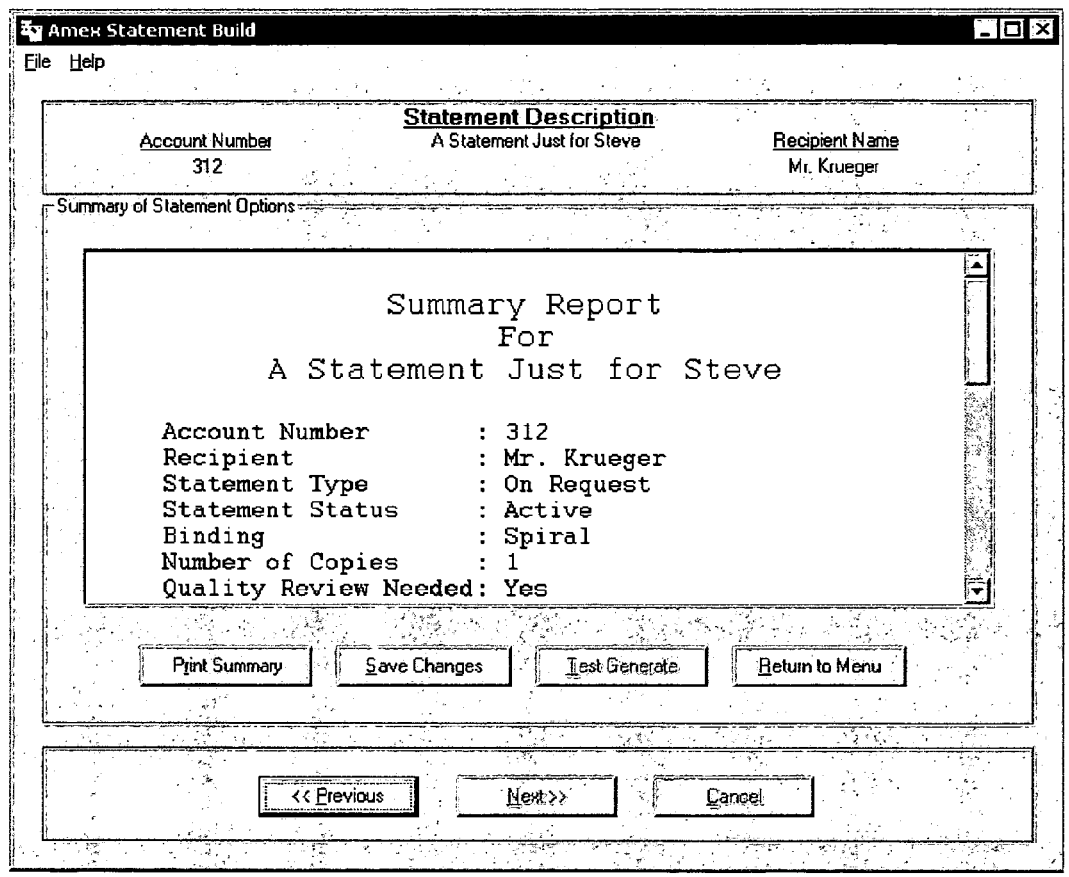
FIG. 8 is a screen display showing an exemplary statement summary window in accordance with the process of FIG. 2.

Upon entry of a valid parameter requested in the window 700, the user may select a 'next' button from the window 700, after which the program 106 next presents an account statement summary to the user (step 212). An exemplary account statement summary window 800 is shown in FIG. 8. This window 800 preferably displays all the information for a selected statement based on the parameters that the user has entered and account data that has been retrieved from the account databases of the central accounting server 102. A scroll bar may be provided for the window 800 to allow a user to see all account summary data presented. A user may select a 'test generate' button from the window 800 to test generate a selected statement prior to batch generation and printing. Upon selection of the 'test generate' command, a calendar is displayed and the user selects the reporting period for the statement. The statement is displayed and the user can review the statement as it will appear when generated with the batch as a word processing document. When a statement is Test Generated, a temporary record is added to the System Value Table 100 described later below. The user can also click the 'print summary' button in the window 800 to print a hard copy of the selected statement for visual inspection prior to batch generation and printing.

If the account summary information presented in step 212 is determined by the user to be correct (step 214), the process 200 continues to step 218 below. Otherwise the process 200 continues from step 214 to step 216 where the user may edit or correct the statement. Statements may be edited to add or remove reports, change a report status, change report parameters, or the like. Statement editing proceeds in a similar manner to statement creation, as described above with respect to step 204. Statements for accounts that have become inactive may be removed from the generation queue by selecting a 'Remove Existing Statement' command. When a statement is deleted, the reporting formats associated with it are removed from the account data stored for the account.

Figure 9:
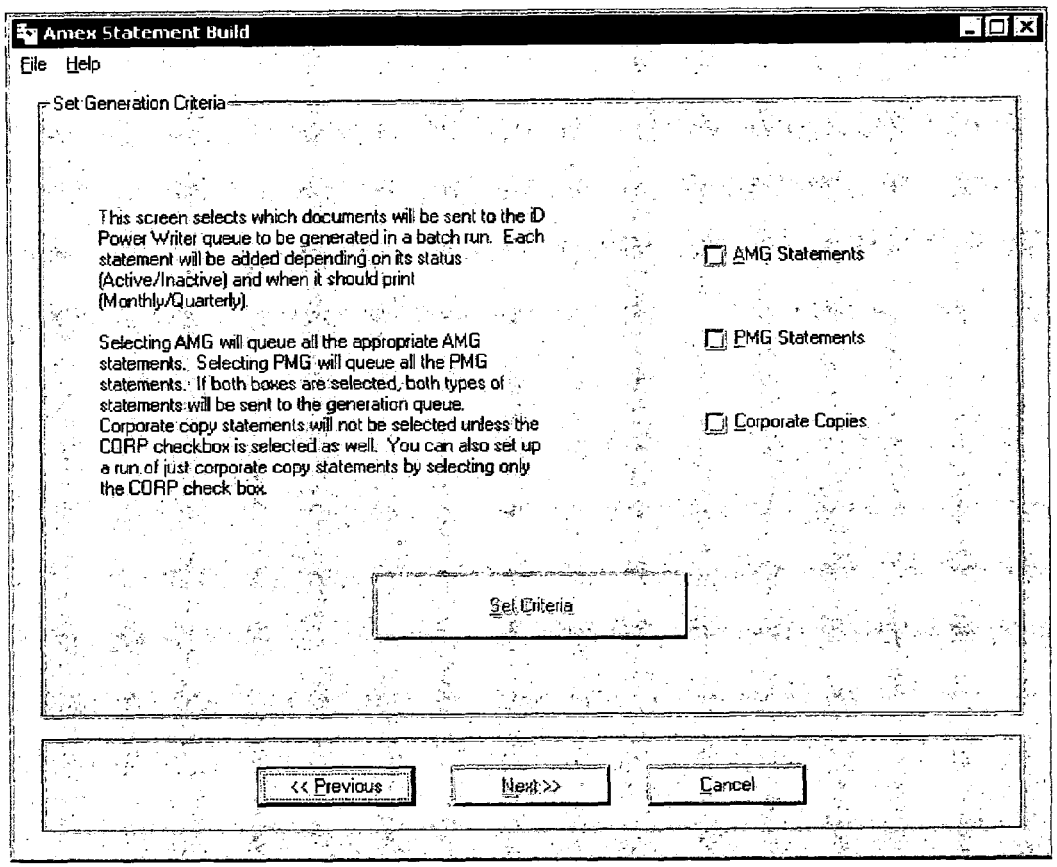
FIG. 9 is a screen display showing an exemplary group selection window in accordance the process of FIG. 2.

Continuing from either step 214 or step 216 above, the process 200 continues to step 218 where the user determines whether there are other statements to edit or create. If so, the process 200 returns to step 204 above. Otherwise the process 200 continues to step 220 where all account statements for a group of accounts is sent for batch generation. In one example, statements may be grouped for a month-end batch generation according to the following criteria: (i) a corresponding account and the selected statement for the account must be active, (ii) statements with a parameter of 'monthly except quarterly' are selected for every month-end except upon for ends of a quarter (e.g. months 3, 6, 9 and 12 of a fiscal year), (iii) statements with a type of 'quarterly' are selected upon calendar quarter end (months 3, 6, 9 and 12 of a fiscal year only), and (iv) statements with a type of 'on request' are not selected for month-end generation. Statements may be added or deleted from the group individually by a user or may be automatically grouped based on the corporate department or personnel responsible for such statement generation. An example of a corporate department selection window 900 is shown in FIG. 9 by which a corporate department may be designated for a selected statement.

Once statements have been selected and generated, those statements designated for quality review in step 208 are made available to the quality review manager program 108. Statements not designated for quality review are instead enabled for direct printing once all statements in the batch requiring quality review have been approved and released for printing. One type of quality review management program 108 is described in a co-pending U.S. patent application entitled "Method And Apparatus For Accommodating Quality Review In An Automated Account Statement Generation Process" filed in the name of the present applicants, and assigned to a common assignee, on a date concurrent herewith, the entirety of which is hereby incorporated by reference. Other methods for performing quality review may likewise be used with the present invention.

In accordance with the descriptions provided above, it should be readily apparent that the statement generation program 106 allows users to group statements in any way desired, and include statements of various types or multiple statements for a single account within the same batch printing run.

In order to maintain account statement data and generate the statements in the reporting formats as described above, it is necessary to store and maintain various relational tables or databases, examples of which will now be described. It should be readily apparent that these databases can be provided in a number of useful forms and that the examples described herein below should not be viewed as the only manner in which such databases may be implemented.

The central accounting server 102 as described above may contain one or more of the following databases for implementing the process 200: a Statement Table 1000, a Report Order Table 1100, a Report Definition Table 1200, a Report Group (and Report Group Sub-Account) Table 1300, a Report Group Recipient Table 1400, a Report Delivery Instructions Table 1500, a System Value Table 1600, a Report Request Table 1700, a Performance Group Table and a Performance Benchmark Table. Each of these database tables will now be described in turn.

The Statement Table 1000 is read to retrieve statements for display within the program 106, and is updated by selections made during statement creation and editing. An exemplary Statement Table 1000 is shown in FIG. 10. The statement table 1000 is operative to retrieve and update data for account statements in a batch generation queue, such as the status of a statement and any parameters required for generating the statement. The Statement Table 1000 also stores an indication of whether the statement will be sent for quality review or direct printing. The Statement Table 1000, accordingly, may include the following fields:

A Statement Identification (Stmt_ID) field contains an identifier assigned by the statement generation application 106 for uniquely identifying each account statement in the batch run. The value stored in this field may correspond to the account number of a selected account.

A Report Group Identification field (Rpt_Grp_ID) is used to store an indication of the group to which each statement belongs, and may include the account number for which the statement has been generated. The report group identifier stored in the Rpt_Grp_ID field originates in the Report Group Table 1300 and is captured in the Report Group Recipient Table 1400, which then updates this field of the Statement Table 1000.

A Recipient Identification field (Recipient_ID) stores the name of the recipient of the account statement and/or other contact information. The value for the Recipient_ID field originates in the Report Delivery Instructions Table 1500. The Report Group Recipient Table 1400 links recipients to report groups for capture in this field of the Statement Table 1000.

A Statement Description field (Stmnt_Desc) contains a description of the statement that is entered when a statement is created in the field 402 of FIG. 4. Such description may not be shown on the resulting printed statement.

A Statement Activity Code (Stmt_Actv_Code) field stores a status of the statement (i.e. active or inactive) based on whether the underlying account is active or inactive. In certain embodiments, only active statements are selected for update in the System Value Table 1600 and the Report Request Table 1700 when statements are selected for generation.

A Statement Frequency Code (Stmt_Freq_Code) field stores the frequency for which account statements are generated for an account (i.e. monthly or quarterly) and may include a period end date by which the statement is to be printed and distributed. The frequency code is assigned or updated by the user within the field 702 of FIG. 7, which entry directly updates this field of the Statement Table 1000. Statements are selected based upon comparison of the frequency to the period end date (i.e., quarterly statements are selected at the end of months 3, 6, 9, 12 of a fiscal year).

A Copies Number (Copies_Nbr) field is maintained to store the number of copies of the account statement that are to be printed in the batch printing run. The user assigns a number of copies for this statement and recipient in the account statement generation program 106 and directly updates the Statement Table 1000.

A Quality Review Indicator (Qlty_Rvw_Ind) field indicates whether the statement is designated for quality review or for direct print. For example, a value of '1' may be used to indicate that the statement is designated for quality review and a value of '0' may indicate that the statement is designated for direct printing without quality review. The user assigns the appropriate 'quality review' indicator in the account statement generation program 106, which then directly updates the Statement Table 1000.

Finally, a Corporate Statement Indicator (Corp_Stmt_Ind) field stores a value indicative of whether corporate copies have been designated in the field 502 of FIG. 5.

It will be readily apparent that further or fewer of the fields described above may be implemented in the Statement Table 1000 as desired.

Turning now to FIG. 11, therein is depicted an exemplary Report Order Table 1100, which is updated dynamically by the program 106 when a statement is saved. Any reporting format that are added to or removed from a selected statement will create an update to this table 1100. The table 1100 will also be updated if the order of reports in a statement is changed by the user. This table 1100 may be used in the statement generation process 200 to obtain the report models to be generated for a given statement. Accordingly, the Report Order Table 1100 may contain any of the following fields:

A Report Order Identification (Rpt_Ord_ID) field stores a sequential number assigned by the account statement generation program 106 for the selected statement. A report Sequence Number field (Rpt_Seq_Nbr) stores a value that indicates the sequence of a reporting format appears within the statement that is assigned by the user or the account statement generation program 106. A Statement Identification (Stmt_ID) field stores the same value as that described in the Statement ID field of the Statement Table 1000 above. The Model identification (Model_ID) field is derived from the Report Definition Table 1200 based on the reporting formats selected by the user during the process 200. An Order Parameter Text (Ord_Parm1-Ord_Parm3_Text) field stores label text that appears on the printed statement.

Referring now to FIG. 12, therein is depicted an exemplary Report Definition Table 1200 that provides the account data required to populate the field 602 of the window 600, from which the user may assign reporting formats to a statement. Accordingly, the Report Definition Table 1200 may contain any of the following fields:

A Model Identification (Model ID) field stores a value that identifies a reporting format model that is assigned to a statement. In particular embodiments, the value may be assigned using the following naming convention for the first two positions of the identifier: 'TS' for a Transaction Summary report, 'TD' for a Transaction Detail report, 'HS' for a Holding Summary report, 'HD' for a Holding Detail report, 'PS' for a Performance Summary report, 'CS' for a client-specific or customized report, and 'B' for a text model.

A Business Owner Code (Busn_Own_Code) field stores an indicator identifying a group to which a statement belongs, where account statements are grouped by corporate departments responsible for the account.

A Report Category Description (Rpt_Cat_Desc) field stores an indication of the report category selected in window 600 as described above. A Report Name (Rpt_Name) field stores the standard name for the reporting format selected for a statement.

Finally, a Parameter Label Text (Parm1-Parm3_Label_Text) field stores the parameter types required for each reporting format.

Referring now to FIG. 13, there is depicted an exemplary Report Group Table 1300 that may be used to accommodate various steps of the process 200. In general, this table 1300 stores characteristics of each group or batch of accounts for which statements are to be generated, including the business owner or corporate department code (e.g., AMG or PMG as shown in FIG. 13) that may become one of the criteria in the selection of groups of statements to be generated and printed. Accordingly, the table 1300 may contain the following exemplary fields:

A Report Group Identification (Rpt_Grp_ID) field stores the account number for each account, or any other unique identification of accounts, and the same value as described above with respect to the field of the same name in FIG. 10.

A Group Description (Grp_Desc) field, a Group Short Name (Grp_Short_Name) field, and Group Long Name (Grp_ Long1-Long3_Name) fields may be used to store group or batch identifiers and any plain language description of each group as desired. The data in these fields may be searchable by any authorized user. Certain of the contents of these fields may also appear on corresponding printed account statements.

A Business Owner Code (Bus_Owner_Code) field stores an indication of the accounting department or employees that are responsible for a corresponding account, which may be used as part of selection criteria for grouping statements for batch generation and printing.

A Display Indicator (Displ_Ind) field is used by the batch statement software application to select accounts to display in the selection box provided for example in the window 400 described previously above. For example, a stored value of 'Y' in this field indicates that the account may be displayed in the application. Similarly, a stored value of 'N' may indicate that the account should not be displayed to a user. In certain embodiments, the 'Y' value must be entered before statements can be created for a given account using the disclosed processes.

Turning now to FIG. 14, there is depicted an exemplary Report Group Recipient Table 1400 that may be used to store all recipients for a given account number, which may then be presented to a user in a drop-down box or the like of the window 400 of FIG. 4. Accordingly, the table 1400 may contain the following exemplary fields:

A Report Group Identification (Rpt_Grp_ID) field stores the values as described in the field of the same name described above with respect to FIGS. 10 and 13.

A Recipient Identification (Recipient_ID) field may store an indication of a recipient that is associated with a corresponding account. The recipients name, or another value pointing to stored recipient information in the table 1500 described below, may be stored in this field.

A Start Date (Start_Date) field stores a date on which the associated recipient has been added to a selected account.

An End Date (End_Date) field may store an indication of the date that a recipient is no longer active for an account. If a date value is stored in this field, no statement will be sent to the recipient after that entered date and the recipient will not be presented to a user in the statement generation application.

Referring now to FIG. 15, there is depicted an exemplary Report Delivery Instructions Table 1500 that may be used to store contact information for recipients, such as recipient name and addresses, statement delivery instructions and any special processing codes. Accordingly, the table 1500 may contain the following exemplary fields:

A Recipient Identification (Recipient_ID) field may store a value similar to that described above with respect to the field of the same name in FIG. 14. Database constraints will not allow multiple recipients to have the same identifiers.

A Recipient Name (Recipient_Name) field may store the first, middle and last name of corresponding recipients. The value stored in this field may appear in the drop-down box in the window 400 of FIG. 4.

A Mail Label Name (Mail_Label_Name) field may stores a name of the recipient that appears on the statement, including a title (e.g. 'Mr.' or 'Mrs.') or name suffix (e.g., "Esq." or "Sr.") that should appear in addition to the recipient's name. The value on this field may be positioned on a printed statement so that it will appear in a window of an envelope for accommodating mailing the statement to a client or recipient.

An Administrative Salutation Text (Adm_Sltn_Text) field or Marketing Salutation Text (Mkt_Sltn_Text ) may store a salutation (e.g., "Dear") that appears on a statement or a cover letter for a statement or marketing materials that accompany a statement.

A Title Text (Title1-Title2_Text) field may be used to specify additional titles, such as "PhD," "M.D." or the like that may be used in a similar manner to that described for the Mail Label Name field above.

The values stored in the following fields may likewise be placed on a statement for printing such that the value appears in a window of an envelope for accommodating mailing the statement to the client:

A Company Name (Company_Name) field stores the name of a company associated with a corresponding recipient or account. An Address Text (Addr1-Addr4_Text) field stores one or more lines of address information corresponding to the recipient. A City Name (City_Name) field stores the city in which the resident receives mailed statements. A Province Name (State_Prov_Name) field may store province information for clients in countries requiring province names in mailing addresses. A County Name (Cnty_Prov_Name) field may store the county corresponding to the mailing address. A Zip Code (Zip_Code) field may store a zip or postal code for a recipient's mailing address. A Country Name (Country_Name) field stores the country of the recipients mailing address.

In addition to the fields above, the table 1500 may also contain the following fields:

A Delivery Method Code (Del_Mthd_Code) field stores a code that is associated with mailing instructions for a corresponding statement. The printing options may be selected by a user in the process 200 above or automatically by the program 106. Exemplary delivery method values include: 'US Mail,' 'Internal,' 'Airborne,' 'Express Courier' or the like.

A Special Processing Code (Special_Proc_Code) field is used in the printing stage to determine which print queue should receive a statement. It is very important that this code be maintained to ensure statements are sent to the correct print queue. If one recipient receives only one statement, the value in this field may store a value of "STD." If a recipient receives more than one copy of a statement, or receives statements for more than one account, then the stored value may be 'MST' or the like.

Print queues may be based on accounting department, as well as by special features of the statement, such as a binding type to be used for assembling the printed statement. In one exemplary implementation, print queues may be established for each corporate department (or other statement grouping), and then by the value in the Special Processing code field, and then by the assembly method to be used. For example, a first printing queue may be established for statements that are spiral bound after printing. A second may be for statements that are to be stapled. In this manner, queued batches of statements may be sent to particular automated printing and assembly equipment that can handle the assembly directed for each statement.

Accordingly, the table 1500 may also have a Bind Method Code (Bind_Mthd_Code) field that stores a value indicative of whether statements are to be, for example, spiral bound or stapled. This code is used in conjunction with the Special Processing Code above to ensure all statements for a given recipient will be assembled consistently.

Turning now to FIG. 16, there is depicted a System Value Table 1600 that is updated to track individual statements and certain values associated therewith. The System Value Table is updated by the program 106 to track statements and their identifiers. Updates from the generation or test generation features of the program 106 remain in the table 1600 until they are selectively or completely purged during the quality review process that is executed with the quality review manager program 108. The System Value Table 1600, accordingly, may include the following fields:

A Current Document Number (Cur_Doc_Num) field stores the document number to each account statement. In certain embodiments, the document number is assigned sequentially with the first eight positions corresponding to the month, day and year of the ending date of the period billed in the statement, with the next four positions sequentially assigned to each account statement starting from a base number.

The Current Period Ending Date and Current Period Cutoff Date (Cur_Per_End_Date, Cur_Per_Cutoff_Date) fields contain the end date of the period covered by the account statement, and the date by which a statement must be printed and distributed dates, respectively. Both dates are derived from the Statement Cycle Date table based upon a match of the Current Period End date assigned from the program 106.

A Business Owner (Bus_Owner) field contains an indication of the accounting department which is responsible for the statement, and corresponds to the value stored in the field of the same name in table 1200. Statements may be organized and generated in a single batch run by the application based upon this code.

Finally, a Statement Identification (Stmnt_ID) field is provided to maintain the same data as that described for the first field of the Statement Table 1000, which is derived from the Report Group Table 1300. The statement documents are assigned a Business Owner code (AMG or PMG) using the appropriate Report Group code for the statement. Statements are generated from the account statement generation program 106 based upon this code. Records are deleted from the System Value Table 1600 either individually, if a single statement is deleted, or all at once where the entire run is purged by a user of the program 106.

In order to generate statements in the process 200 as described above, the central accounting server 102 may maintain a Report Request Table 1700 as shown in FIG. 17. (Due to the length of this table 1700, it is shown in FIG. 17 as split into two parts.) The table 1700 may be updated by the disclosed statement generation program 106 during the statement generation process 200, and then later by the quality review management program 108 as each statement is reviewed in one or more rounds of quality review. The Report Request Table 1700, accordingly, may include the following fields:

A Request Identification (Rqst_ID) field contains a sequential number assigned to each report request and is maintained for tracking purposes only.

A Request Code (Rqst_Code) field stores an indication of whether the record is a generation record or a print record. It is used by the application to manage the records for each statement, printing instructions, and the display of information to a user. The following exemplary values may be used for this field: '3'=Generation Record (i.e. statement is to be displayed on the quality review tab 302); '4'=Print Record (i.e., statement is to be displayed on print status tab 304) and '6'=Printed Record (indicates that a statement has been printed). In certain embodiments, an initial update to the table 800 may result only in values of '3' and/or '4' being stored in the Request Code field.

A Request Document Identification (Rqst_Doc_ID) field maintains an identifier of the statement to be generated. A Request Description (Rqst_Desc) field maintains the statement description entered in the Stmt_Desc field of the Statement Table 600. A Request Policy Name (Rqst_Plcy_Name) field stores a constant document number value. A Request Policy Identification (Rqst_Plcy_ID) field maintains the same value as the current document number field stored in the System Value Table 700. A Request Document Name (Rqst_Doc_Name) field maintains the same value as the Request Policy Identification field, or further statement name indicators. A Request Error Description Code (Rqst_Error_Desc)

field maintains a value that is updated after POWERWRITER is run to generate statements. Any statements that produce errors will have an error indicator stored in this field.

A Request Status Code (Rqst_Stat_Code) field maintains the current status of a statement during each update to the table 1700, and is displayed in the quality review management program 108. Exemplary values for this field include:
- 'P'=Pending Generation
- 'R'=Rejected
- 'E'=Error
- 'C'=Generation complete (successful)
- 'S'=Statement will be sent to single statement (local) print queue
- 'M'=Statement will be sent to multiple statement print queue Additionally, the table 1700 may include a Request Date (Rqst_Date) field that stores the date on which the account statement was generated and is not set until POWERWRITER is run to generate the statements. Finally, a Request Approval Indicator (Rqst_Apr_Ind) field maintains a value indicative of whether or not a statement has been approved during the quality review process executed in conjunction with the program 108. Exemplary values for this field include:
- 'N'=Not approved
- 'Y'=Approved
- 'B'=Statement is set for batch printing
- 'K'=record is to be kept for display in the quality review management program 108.

The statement generation program 106 and the account statement generation process 200 disclosed herein have reduced manual intervention and resulted in higher quality account statements. Using this system, data is more easily obtained from statements for marketing purposes and data accuracy is more readily validated, while the effort and expense associated with regenerating batch statements runs is reduced. Statements from various account types may be organized, reviewed and batch printed in the same group, which functionality was not possible in many prior systems. The professional presentation of statements resulting from the processes described herein will enhance a company's marketing potential and client retention.

Although the best methodologies of the invention have been particularly described in the foregoing disclosure, it is to be understood that such descriptions have been provided for purposes of illustration only, and that other variations both in form and in detail can be made thereupon by those skilled in the art without departing from the spirit and scope of the present invention, which is defined first and foremost by the appended claims.

What is claimed is:

1. A method for generating account statements for batch printing, comprising:
   grouping a plurality of accounts for which account statements are to be generated in a batch printing run;
   receiving, at a computer, account data for each of the plurality of accounts, the account data for use in generating at least one account statement for each of the plurality of accounts;
   presenting, to a user, a plurality of reporting formats that are available to be assigned to at least one of a plurality of account statements, each of the plurality of reporting formats defining parameters relating to a report layout, a report delivery method, and a report assembly method;
   receiving, from the user, a selection of a first account from the plurality of accounts, and a selection of a first reporting format for the first account and a second reporting format for the first account from the plurality of reporting formats for the first account;
   updating, by said computer, a report order table with a first model identifier corresponding to the selection of the first reporting format and a second model identifier corresponding to the selection of the second reporting format, wherein the first model identifier and the second model identifier are each associated with one of the plurality of reporting formats;
   receiving, from the user, a selection of a second account from the plurality of accounts, and a selection of a third reporting format for the second account and a fourth reporting format for the second account from the plurality of reporting formats for the second account;
   updating, by the computer, the report order table with a third model identifier corresponding to the selection of the third reporting format and a fourth model identifier corresponding to the selection of the fourth reporting format, wherein the second account first model identifier and the second account second model identifier are each associated with one of the plurality of reporting formats;
   receiving, from a user, a designation for corporate review corresponding to at least one of: the first account and the second account, wherein said designation for corporate review is stored with statement parameters;
   retrieving, by said computer, the statement parameters applicable to the account statements, wherein the statement parameters include a recipient list, statement description, statement type, statement status, a number of copies to be generated, the designation for corporate review, and a designation for internal copies;
   assembling, by said computer, a directory of individual account statements, wherein said directory of individual account statements includes the designation for corporate review;
   performing, by said computer, an automatic review of the individual account statements based on said statement parameters;
   performing, by said computer, an automatic approval the individual account statements in response to said individual account statements being compliant with said statement parameters;
   preventing the batch printing run until all individual account statements within the batch printing run are approved and released based on said automatic review;
   receiving, from a reviewer, a selection of an account statement from the directory for review;
   presenting the selected account statement to the reviewer;
   receiving, from the reviewer, at least one of: an approval of the selected account statement, a rejection of the selected account statement, a correction of the selected account statement, a request for regeneration of the selected account statement, and a request to delete the selected account statement;
   releasing the selected account statement for the batch printing run;
   retrieving, from the report order table, the first model identifier, the second model identifier, the third model identifier, and the fourth model identifier to generate batch print instructions;
   generating, in accordance with the statement parameters and the batch print instructions, a first account statement for the first account, a second account statement for the first account, a third account statement for the second account, and fourth account statement for said second account; and delivering, in accordance with the statement parameters and the batch print instructions, the first account statement, the second account statement, the third account statement, and the fourth account statement.

2. The method of claim 1, said grouping further comprising:
grouping the plurality of accounts based on a group designation selected by the user.

3. The method of claim 2, wherein at least one of: the first statement, the second statement, the third statement, and the fourth statement comprises at least one of a billing statement, a credit card statement, and a summary of investment holdings.

4. The method of claim 3, wherein the account data is retrieved from a financial database.

5. The method of claim 4, further comprising:
receiving, from the user, a correction of the account data for at least one of: the first account and the second account, wherein the correction is entered into the financial database.

6. The method of claim 5, further comprising:
receiving, from the user, a selection of the second reporting format for the first account; and
generating a fifth statement for a third account and sixth statement for the third account in at least one of: the third reporting format or fourth reporting format for the first account, the first statement, the second statement, the third statement, the fourth statement, the third account first statement, and the third account second statement for printing in the batch printing run.

7. The method of claim 6, further comprising:
receiving, from the user, a selection of a third reporting format from the plurality of reporting formats for the second account; and
generating a third account statement in the third reporting format for the second account, said first, second and third account statements for printing in the batch printing run.

8. The method of claim 7, further comprising:
designating at least one of the first statement, the second statement, the third statement, the fourth statement, the fifth statement, and the sixth statement for quality review.

9. The method of claim 8, wherein said report order table includes fields for at least one of: a time period for said account statements, a status of the accounts corresponding to said account statements, a corporate group responsible for the accounts, a number of copies of the account statements to be printed in the batch printing run, and a designation of whether the account statements are to undergo quality review.

10. The method of claim 9, further comprising:
printing the batch printing run after said generating and a completion of a quality review for all designated account statements in the batch printing run.

* * * * *

UNITED STATES PATENT AND TRADEMARK OFFICE
CERTIFICATE OF CORRECTION

PATENT NO. : 7,653,587 B2  Page 1 of 1
APPLICATION NO. : 10/820071
DATED : January 26, 2010
INVENTOR(S) : Alana King et al.

It is certified that error appears in the above-identified patent and that said Letters Patent is hereby corrected as shown below:

In column 16, line 19, please delete "first" and insert therefor --third--.

In column 16, line 20, please delete "second" and insert therefor --fourth--.

In column 17, line 25, please delete "the third reporting format" and insert therefor --a third reporting format--.

In column 17, line 26, please delete "fourth reporting format" and insert therefor --a fourth reporting format--.

In column 18, line 1, please delete "first statement" and insert therefor --a fifth statement--.

In column 18, line 1, please delete "second statement" and insert therefor --a sixth statement--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,653,587 B2
APPLICATION NO. : 10/820071
DATED : January 26, 2010
INVENTOR(S) : King et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1025 days.

Signed and Sealed this

Twenty-third Day of November, 2010

David J. Kappos
*Director of the United States Patent and Trademark Office*